Jan. 2, 1951 W. W. TAYLOR 2,536,965
HYDRAULIC VALVE OPERATED BY DIFFERENTIAL PRESSURES
Filed Feb. 24, 1948 2 Sheets-Sheet 1
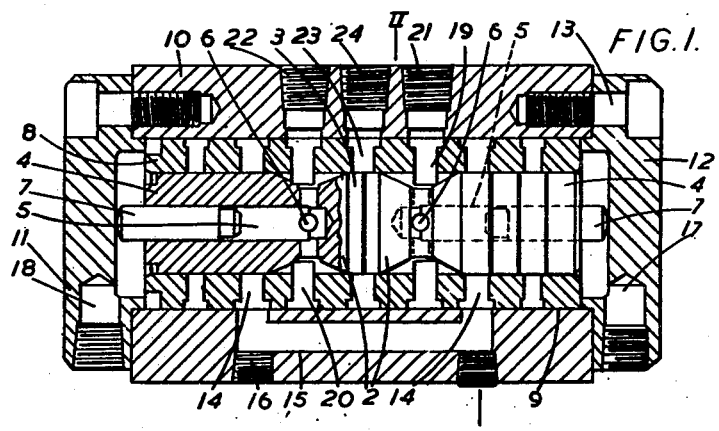
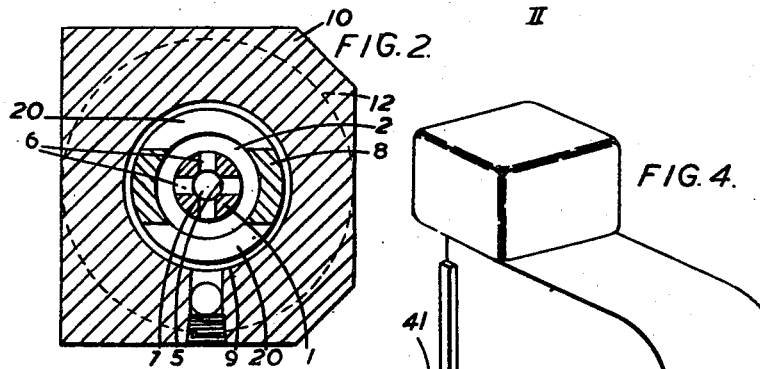
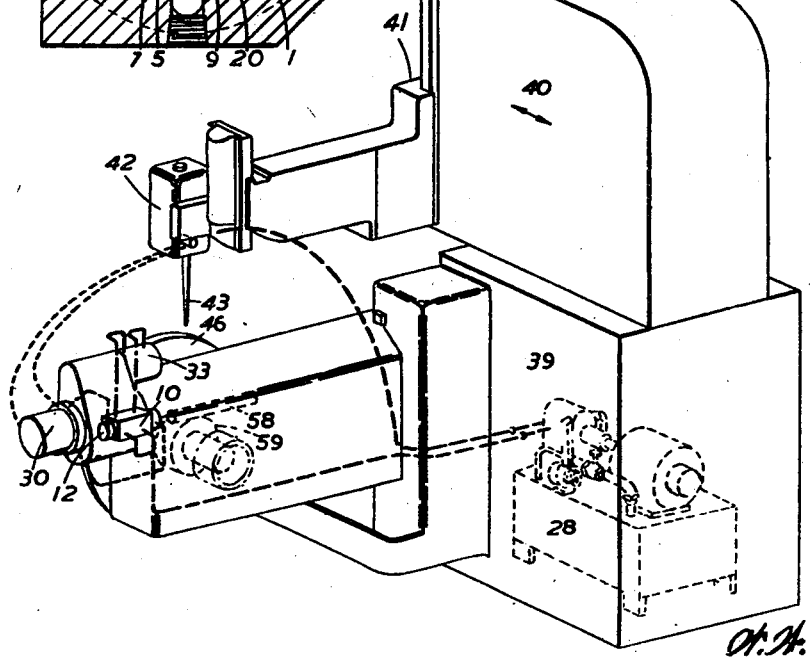
Inventor
W. W. Taylor
By
E. F. Wenderoth
Attorney Jan. 2, 1951  W. W. TAYLOR  2,536,965
HYDRAULIC VALVE OPERATED BY DIFFERENTIAL PRESSURES
Filed Feb. 24, 1948  2 Sheets-Sheet 2
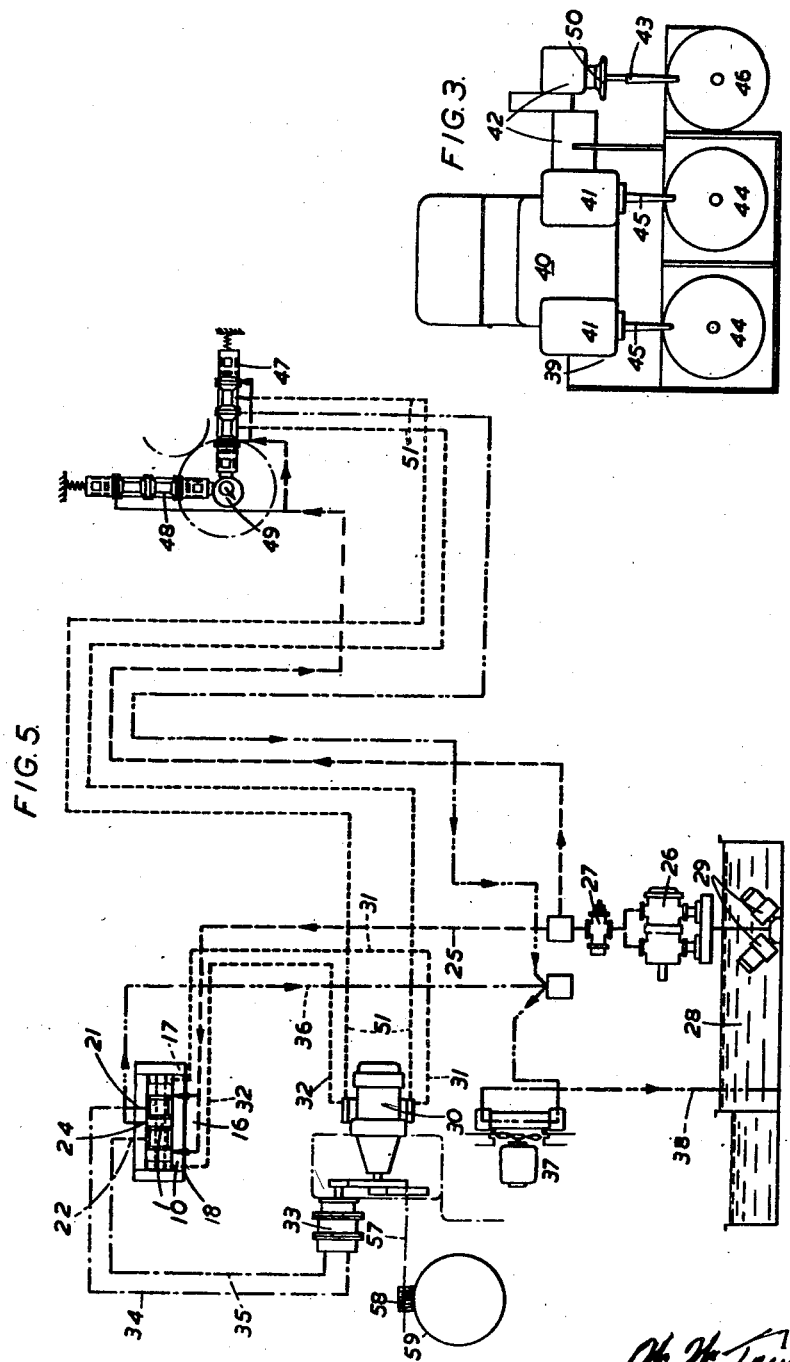

Patented Jan. 2, 1951

2,536,965

UNITED STATES PATENT OFFICE 2,536,965

HYDRAULIC VALVE OPERATED BY DIFFERENTIAL PRESSURES

William Whitworth Taylor, Cincinnati, Ohio, assignor to Cincinnati Milling Machines Limited, Birmingham, England, a British company Application February 24, 1948, Serial No. 10,467
In Great Britain August 23, 1946

Section 1, Public Law 690, August 8, 1946
Patent expires August 23, 1966

3 Claims. (Cl. 121—46.5)

This invention is concerned with hydraulic control systems and has particular reference to hydraulic valve means operating by differential pressure. The kind of valve to which the present invention primarily relates is that which is in the form of a spool slidable within a housing, the spool comprising a cylindrical plug having intermediately of the length thereof two or more spaced apart zones of reduced diameter providing one or more pairs of neck portions each flanking the opposite sides of a collar. The invention is specially but not exclusively applicable to hydraulic controls for macihne tools.

It is already known to provide a two-directional hydraulic valve having an amplifying action, that is, one capable of converting a primary pressure differential acting on opposing end faces of the spool into a secondary pressure differential across two necks of the spool. This secondary pressure differential may vary from zero, such as when the spool is disposed at the centre of length of its travel in its housing, to a maximum which is dependent on the working pressure of the oil supply to the secondary circuit, when the valve is fully open. In order to secure sensitive response to primary pressure changes in a valve of the character above referred to, the component parts of the valve need to be made to a high degree of accuracy, since the position of the housing porting relative to the form of the spool must be such that a small movement of the spool will give a relatively sudden change of secondary pressure differential. Where, however, a feed-back connection is made from the valve this sudden change in the secondary pressure differential has been found to lead to instability, hunting and a tendency to set up violent pulsations in the secondary hydraulic circuit.

One instance of an application of a two-directional hydraulic valve of the character referred to, where the above noted disadvantages have been apparent, is that of a hydraulic control system, incorporating the feed-back principle, used to amplify a weak hydraulic impulse in a profile milling machine. There are numerous other applications where similar conditions of instability, hunting and vibration arise due to the use of a spool valve of the kind referred to, and the object of the present invention is to provide an improved form of valve operating in a novel manner to the end that the disadvantages above referred to are avoided.

The above mentioned object is achieved by constructing the valve so as to limit the rise in secondary pressure differential to any desired multiple of the primary pressure differential which is within the range of stable amplification.

In carrying the invention into practice use may be made of a spool valve which is formed so as to accommodate slidable auxiliary plungers which project out from the opposite ends of the spool into endwise engagement with the inner end faces of the valve housing, and with their inner piston faces hydraulically connected through the body of the valve spool so as to be subject to the pressure conditions prevailing around appropriate necks of the spool.

In order that the invention may be more readily understood, one form of amplifying valve constructed according to the invention as applied, by way of example, to the hydraulic control system of a profile milling machine will now be described with the aid of the accompanying drawings, wherein:

Figure 1 is a longitudinal sectional view of the control valve with the spool shown partly in section;

Figure 2 is a cross section of the valve on line II, II of Figure 1;

Figure 3 is a schematic outline drawing of a form of profile milling machine to which a hydraulic circuit incorporating the valve shown in Figures 1 and 2 can readily be applied, the machine having two synchronously rotatable work carriers associated with cutter heads which reproduce the movements of a tracer finger as it moves over a master pattern on a pattern table which is shown on the righthand side of the machine;

Figure 4 is a pictorial view looking at the rear of the pattern table and tracer mechanism; and Figure 5 is a diagram which shows so much of the hydraulic control circuit of the machine as is necessary to understand the manner in which the control valve functions.

In the construction of the control valve illustrated in Figures 1 and 2, the valve employs a spool 1 which has a pair of necked portions 2, 2 flanking a collar portion 3 set centrally between, and of the same diameter as, the equal size head portions 4, 4 provided at opposite ends of the spool 1. The two heads 4, 4 are provided with two sockets 5, 5 in the form of cylinders which open out one at each of the opposite end faces of the spool heads, said sockets 5, 5 being disposed, for convenience, with their longitudinal axes in alignment and coincident with the longitudinal axis of the spool 1. The inner end of each socket hole is connected for free fluid flow by means of suitable cross holes 6 with the annular space around one of the necks 2 of the spool 1. Within each socket 5 is slidably accommodated a plunger 7, the area of the end face of each plunger 7 bearing a predetermined ratio to that of the corresponding end face of the spool 1. The ratio of plunger and spool areas is the same for each end of the spool, and this ratio of areas is equivalent to the ratio of the secondary to primary pressure differentials acting on the spool and plungers, and gives the required degree of amplification. It has been found that at present the safe amplification of pressure differentials is approximately ten to one; above that factor there is a tendency for "hunting" to reappear.

The spool 1 is freely slidable within a cylindrical liner 8 clamped within the bore 9 of a housing 10 by means of recessed end covers 11, 12 secured to said housing 10 by screws 13. The spool 1 is shown in Figure 1 in mid-position, and when thus disposed the inner ends of the two heads 4 close the porting 14 in liner 8 and passages 15 in body 10 which connect through connection 16 with a source of operating fluid under pressure. The opposite ends of the spool 1 are subject to a primary pressure differential inflowing through connections 17, 18, whilst the secondary pressure differential, which takes effect within the necks 2, 2 on opposite sides of the central collar 3, outflows through liner porting 19, 20 and the respective connections 21, 22. The collar 3 is shown as closing liner porting 23 which leads to a discharge connection 24 for returning fluid to the pump circuit from whence the operating fluid is supplied under pressure.

In the hydraulic circuit illustrated diagrammatically in Figure 5, the control valve is shown with the operating fluid connection 16 connected by pipeline 25 to a pump 26 via a relief valve 27 set at a high pressure, e. g., about 400 pounds per square inch, the pump 26 drawing "hydraulic" oil from a sump 28 through filters 29. The primary pressure differential is derived by coupling a hydraulic pilot motor 30, which has inherently poor torque characteristics, to connections 17, 18 of the control valve by means of pipelines 31, 32 respectively, whilst the secondary pressure differential obtained at the necks 2, 2 of the valve spool 1 is applied to a hydraulic boost motor 33 by coupling the motor 33 to the connections 21, 22 by means of pipelines 34, 35 respectively. The discharge connection 24 has attached to it a pipeline 36 for returning the operating fluid to the oil sump 28 via a fan-cooled radiator 37 and return pipe 38.

The profiling machine for which the incomplete hydraulic circuit shown in Figure 5 is primarily intended is of known form and comprises essentially a fixed base 39 (see Figures 3 and 4) upon which a ram 40 is slidably supported, said ram 40 carrying a pair of cutter heads 41, 41 and a tracer attachment 42 provided with a tracer finger 43. The cutter heads 41, 41 and the tracer attachment 42 move in unison so that workpieces mounted on the rotary work-tables 44, 44 are fashioned by cutters 45, 45 on the cutter heads 41, 41 as the cutters 45, 45 reproduce the movements of the tracer finger 43 as it traverses the profile of a master template mounted on the rotary template table 46, the tables 44 and 46 rotating synchronously.

In order to make the tracer finger 43 and hence the cutters 45 travel in any path, it is only necessary to be able to control at any instant the relative motion of the synchronously turning tables 44 and 46 and the sliding ram 40 through the action of their respective feed rate valves, viz. the table feed rate valve 47 and the ram feed rate valve 48 (Figure 5), displacement of the feed rate valves 47 and 48 being accomplished by means of a variable eccentric mechanism 49 coupled to the tracer directional handwheel 50 (Figure 3). The desired rate and direction of feed is achieved through controlling the feed rate valves 47, 48 so that the former admits the proper amount of oil to the hydraulic motor 30 coupled to it by pipelines 51. The ram feed rate valve 48 is coupled to a ram operating cylinder (not shown). Means whereby tracer finger 43 is made to control feed rate valves 47, 48 is known and has been described in Patent Specifications (British) 465,-367; 578,883 and 581,148. The loading on pilot motor 30 brings about a pressure difference in lines 51 and this in turn is transferred to ports 17 and 18 of the control valve, through lines 31 and 32 respectively.

This hydraulic signal obtained as the primary pressure differential is amplified by the control valve provided in accordance with this invention into a secondary pressure differential which may be as high as ten times as strong as the weak signal. The resultant amplified secondary pressure differential is applied to the hydraulic boost motor 33 which is coupled to the same drive shaft 57 as the pilot motor 30, thus supplying the necessary deficiency in torque. The shaft 57 carries a worm pinion 58 meshing with a gear wheel 59 through which rotary motion is transmitted to the template table 46.

Assuming that there is an initial primary pressure differential applied across the two ends of the spool 1 (Figure 1) which tends to move the spool in one direction, for example, toward the left, the resulting movement of the spool 1 will open the liner port 14 which connects the left-hand neck of the spool to the pump pressure line 25, the other liner port 14, which is adapted to feed into the annular space around the right-hand neck remaining cut off from pump pressure. This spool movement to the left allows passage of oil into port 22 and through line 35 to boost motor 33, returning through line 34 to port 21. The loading of motor 33 gives rise to a secondary pressure differential, through ports 21 and 22 and is also established across the two necks 2, 2 of the spool 1, which is utilised to actuate the hydraulic boost motor 33. By reason of the free paths of communication between the annular spaces around the two necks of the spool and the inner ends of the plunger sockets at corresponding ends of the spool, this secondary pressure differential acts on the two plungers 7 with the result that the spool 1 moves now in the reverse direction, that is, to the right. Stability is attained when the two forces acting on the spool are equal and opposite, and this condition is reached when the product of the primary pressure differential and the net area of the cross section of the spool end is equal to the product of the secondary pressure differential and the area of the cross section of the plunger. From the equation which expresses this relationship, it will be readily understood that the ratio of pressure differentials depends on the inverse ratio of spool and plunger areas.

I claim:
1. A control valve comprising a valve housing having a cylindrical bore, a valve spool in said bore, sockets formed in the opposite end faces of said valve spool which are subjected to a primary pressure differential, slidable plungers in said sockets which remain substantially fixed in relation to opposite ends of the bore of said valve housing, spaced neck portions on said spool, said sockets communicating hydraulically with said spaced neck portions across which prevails a desired secondary pressure differential.

2. A control valve as claimed in claim 1, and wherein said plungers comprise free elements slidably mounted in the spool end sockets, said freely slidable plungers being projected partially from the mouths of the sockets, by fluid pressure, into engagement with opposing end faces of said valve housing bore.

3. A control valve comprising in combination a valve housing with a cylindrical bore, a spool freely slidable within said housing, a pair of necked portions on said spool, a collar disposed between heads at opposite ends of said spool, said necked portions flanking said collar, sockets which open out one at each of the opposite end faces of the spool heads, cross holes for communication between said sockets and the appropriate neck portions, and a pair of floating plungers freely slidable within the spool sockets, the valve housing having connections to two points at opposite ends of the bore thereof providing for inflow of fluid to afford a primary pressure differential, to two points closed by the spool heads and providing for inflow of boost operating fluid under substantially constant pressure, to two points normally aligned with the necked portions when the spool is in mid-position and providing flow of fluid to afford a secondary pressure differential when the spool is displaced from mid-position.

WILLIAM WHITWORTH TAYLOR.

REFERENCES CITED

The following references are of record in the file of this patent:

UNITED STATES PATENTS

| Number | Name | Date |
|---|---|---|
| 2,210,917 | Kenyon et al. | Aug. 13, 1940 |
| 2,283,753 | Harcum | May 19, 1942 |
| 2,331,337 | Meyer | Oct. 12, 1943 |
| 2,332,533 | Roehm | Oct. 26, 1943 |
| 2,400,126 | Matthews | May 14, 1946 |
| 2,406,181 | Wiegand | Aug. 20, 1946 |